(12) United States Patent
Vittal et al.

(10) Patent No.: US 6,907,401 B1
(45) Date of Patent: Jun. 14, 2005

(54) PORTAL SWITCH FOR ELECTRONIC COMMERCE

(75) Inventors: John Jacques Vittal, Lexington, MA (US); Cynthia Grace Mills, Bedford, MA (US); Laurence Raphael Brothers, Waltham, MA (US)

(73) Assignees: Verizon Corporate Services Group Inc., New York, NY (US); Genuity Inc., Cambridge, MA (US)

( * ) Notice: Subject to any disclaimer, the term of this patent is extended or adjusted under 35 U.S.C. 154(b) by 0 days.

(21) Appl. No.: 09/524,112

(22) Filed: Mar. 13, 2000

(51) Int. Cl.[7] ............................................. G06F 17/60
(52) U.S. Cl. ........................................ 705/26; 705/27
(58) Field of Search ............................ 705/26, 25, 27; 709/228; 707/9, 10

(56) References Cited

U.S. PATENT DOCUMENTS

| | | | |
|---|---|---|---|
| 5,527,156 A | 6/1996 | Herr-Hoyman et al. | 395/200.49 |
| 5,842,178 A | 11/1998 | Giovannoli | 705/26 |
| 5,862,223 A * | 1/1999 | Walker et al. | 380/25 |
| 5,950,173 A * | 9/1999 | Perkowski | 705/26 |
| 6,128,624 A | 10/2000 | Papierniak et al. | 707/104 |
| 6,233,609 B1 | 5/2001 | Mittal | 709/219 |
| 6,405,174 B1 * | 6/2002 | Walker et al. | 705/14 |
| 6,510,418 B1 * | 1/2003 | Case et al. | 705/26 |
| 6,584,451 B1 * | 6/2003 | Shoham et al. | 705/37 |
| 6,615,247 B1 * | 9/2003 | Murphy | 709/217 |
| 6,751,669 B1 * | 6/2004 | Ahuja et al. | 709/228 |
| 6,760,758 B1 * | 7/2004 | Lund et al. | 709/217 |
| 6,801,938 B1 * | 10/2004 | Bookman et al. | 709/224 |
| 6,845,448 B1 * | 1/2005 | Chaganti et al. | 713/166 |
| 2002/0007099 A1 * | 1/2002 | Rau et al. | 705/26 |
| 2002/0016910 A1 * | 2/2002 | Wright et al. | 713/150 |
| 2002/0032611 A1 * | 3/2002 | Khan | 705/26 |
| 2002/0128916 A1 * | 9/2002 | Beinecke, III | 705/26 |
| 2003/0065591 A1 * | 4/2003 | Jones | 705/28 |

FOREIGN PATENT DOCUMENTS

WO    WO-9621192 A1 * 7/1996

OTHER PUBLICATIONS

Dalton, G., "XML Becomes a Standard; Vendors Ready Products—Language Likely to Boost E–Commerce, Ease Web Searches," Information Week, p. 34, Feb. 16, 1998.*
Luh, J.C., "Group contemplates Syndication Spec," Internet World, vol. 21, No. 1, Nov. 2, 1998.*

* cited by examiner

*Primary Examiner*—Nicholas D. Rosen
(74) *Attorney, Agent, or Firm*—Leonard C. Suchtya, Esq.; Joel Wall, Esq.; Foley, Hoag & Eliot LLP

(57) ABSTRACT

A portal switch is provided that controls participation of merchants in on-line aggregators, such as portals, used for buying and selling goods and services. Merchants may enable or disable participation in an aggregator site by turning on or off software settings. When participation is enabled, the merchant's site makes its catalog entries and merchant profile available to the aggregator. By enabling or disabling the switch, the merchant actively expresses a willingness to participate in (or, conversely, a desire to be excluded from) the aggregator.

25 Claims, 11 Drawing Sheets

| User | Contents | Type | Defaults / Actions |
|---|---|---|---|
| busname | Legal Name of Entity | Business Name | |
| comnames | Commonly used names and abbreviations | Commonly Used Names (optional) | |
| server | web server name | Commonly Used Names (optional) | Default to hostname and domain name |
| duns | Dun & Bradstreet identifier (recommended) | DUNS | Use business name already input to fire off a search to D&B web site (www.dmb.com), list responses, allow user to select [or enter none] |
| contact | Contact information (physical address, phone, e-mail address) | Contact | |
| products | Keywords | Product | |
| date | Date business established | Date Established | Use DUNS report as default value |
| jurisdiction | State or jurisdiction in which web business is incorporated or registered | Jurisdiction ISO country code, state/ province code | Use DUNS report as default value |
| states | States or jurisdictions in which business has presence (to determine sales tax) | States | Use DUNS report as default value |

FIG. 6A

| type | | | |
|---|---|---|---|
| | Business type (as categorized in yellow pages or DUNS) | Type of Business | Use DUNS report |
| Authorization URL | Pointer to the portal-switch access port for this user | Type of Business | If host machine has static IP address, default to IP adress, Port XXX for TCP/IP access to portal switch, otherwise default to e-mail address for portal-switch* |
| ID cert. | | ID certificate | A copy of the user's ID certificate, if he has one |
| Portal-Switch cert. | Unique identifiers | Portal switch certificate | Create an X.509v3 certificate with above information, optionally signed by the user's ID certificate (or self-signed) if no ID certificate pre-exists. V3 extensions must include authorization URL |
| Cert. auths. | Certificate authorities | | |

FIG. 6B

| | | | |
|---|---|---|---|
| Participant/ Partner | A name for the participant/partner or group of participants/partners for which this method (or set of methods) is valid | UIDs for lookup in the participant/ partner table | Default to everyone, allow participants to select individuals |
| Transport Method | Transport method available and transport address (e.g., RFC 822 e-mail, tcp/ip port number, udp port number | Transport | List options, allow participant to select several |
| Transfer Protocol | Data transfer protocols supported (e.g., ODBC, http, ftp) | Transfer | For each transport method list options, allow participant to select several |
| Access Format | Data formats supported and translation tables (XML and XML schema, comma separated values, excel spreadsheet, etc.) | Access | For each transfer protocol, list options, allow participant to select several |
| Query Format | If a special query format is required, provide it here | Fields | |
| Parse Format | If a special parsing code is required, provide it here | Type, Content | The type might be TCL and the content be a set of TCL commands, or the type might be Java and the content be Java code to translate into the field data below. See notes on defaulting below. |
| Field Data | Data fields supported, starting with Product Id, BarCode, Description, Price, Manufacturer, and optionally Detailed Feature Data (see associated product database description) | Field | For each access format, list order, show simple form first, followed by optional feature data |
| Time of Day | Time of day restrictions, if applicable | Time of day | Indicate time of day restrictions (daily, monthly, ...) |
| Frequency | Update frequency | Frequency | Indicate the "refresh" rate and units (seconds, days, weeks, ...), or interval between queries, 0 for auction (validity is instantaneous but not enduring), -1 for unspecified long-term validity |
| Quantity | Number of records | Number of records | Indicate the minimum/ maximum number of records to be delivered at a time, 0 for no limit |

FIG. 7

| | | | BLACKLISTER, BLACKLISTEE, or DEFAULT |
|---|---|---|---|
| Partner listname | A UID for this group of partners | Unique ID | |
| Certificate Mask | Mask that identifies fields in the partner's certificate and indicates whether or not they are members of this group. | Certificate mask | Optional mask, blank if only explicit certificates belong to this group |
| Explicit Certificate List | List of certificates. | List of certificate IDs or URLs | List of certificates explicitly in this list, either by a copy of each certificate or by a "trusted" URL pointing to a certificate ID or list of certificates |
| Implicit Certificate List | List of certificates that have been granted or denied access under this rule | Certificate ID | List of certificates that have been granted or denied access under this set of rules but that were not explicitly in this list |

FIG. 8

PORTAL SWITCH FOR ELECTRONIC COMMERCE

FIELD OF THE INVENTION

This application relates to the field of electronic commerce and more particularly to methods and systems which enable a merchant to control data provided to an online aggregator, such as a portal, for the purpose of selling goods and services.

BACKGROUND OF THE INVENTION

Online shopping and online commerce is quickly becoming one of the top Internet activities. For example, a user can search on the Internet for a specific product and/or service and can receive a list of merchants who carry the item of interest or provide the respective service. For this purpose, the user typically uses a search engine, such as Yahoo™, or Excite™. Merchants may include individuals or organizations offering to buy, sell or exchange goods, services and information on the Internet.

With the proliferation of Web sites and Internet merchants, many of whom sell similar products, it has generally become increasingly difficult for a consumer to find a product or service. For this reason, aggregators, such as a portal or other entity aggregating product and server information, have been established as public or private providers of shopping services to consumers and organizations. Such aggregators typically have listings of goods and services, much like the yellow pages, which allow a consumer to comparison shop and find information about the goods and services at one location, such as a single Web site. These aggregators may use software, known as robots, to find and compare goods and services, and present the consumer, for example, with a best priced item.

Aggregators may focus on shopping information and activities that involve multiple merchants, such as consumer comparison shopping, virtual malls, and exchanges (e.g., classified advertising and formal requests for proposals). Aggregator sites may be open to the general public, or to membership sites serving a selected group of individuals and organizations.

Aggregators may utilize Web robots, software that enables a search through the Web's hypertext structure to retrieve documents on remote sites. Aggregators may help retrieve documents related to Web statistics (e.g., how many Web sites exist?), maintenance (e.g., are links oudated or "dead"?), updates of a database (Does my local copy of some software reflect changes made to some offsite, updated master software?), and search topics. An example of a search topic is the price of a certain commercial product. An aggregator may be used to determine the best price of a commercial product listed on the Internet, for example.

Individual merchants may contract with the aggregator to provide users with information about the merchant, to prominently advertise the merchant's products and services, and to also accept orders for the merchant's merchandise and arrange payment for orders received. A merchant having an Internet address may register with the provider of the search engine to have the merchant's universal resources locator (URL) prominently displayed in order to receive a large number of user visits, or "hits," to the merchant's Web site. The aggregator may also provide the merchants with a summary of on-line purchases and an audit trail. In order to be listed and conduct business with the aggregator, however, a merchant may have to enter into a longer-term contractual relationship with the aggregator and disclose confidential information, such as financial or business information, to the aggregator. The aggregator, on the other hand, without an agreement in place with the merchant may incur expenses with a) finding a merchant b) accessing the merchant's web site for appropriate data, c) determining how to interpret the available data and d) establishing that such data mining operations do not violate the copyright of the merchant. In addition, the aggregator may be limited to acquiring only that data which the merchant chooses to make publicly available. If the merchant is one with whom the aggregator would like to have an agreement, additional effort and time may be involved in signing a merchant up for service and manually or periodically updating the merchant's listing and uploading audit information to the merchant, such as the number of hits of the URL of the merchant.

It would therefore be desirable for an aggregator to have an automated means of acquiring a merchant, deciding whether or not to include a merchant in a service of the aggregator, and having permission to use the data of the merchant on the site of the aggregator in accordance with the specifications of the merchant, and what the aggregator has agreed.

SUMMARY OF THE INVENTION

To facilitate the use of aggregators, a portal switch may be introduced that allows a merchant of a commercial product, or service to have more control of the information made available to the aggregator.

More specifically, a computer-implemented method to permit a merchant to selectively participate in an aggregator is provided. The method includes providing software recognized by the aggregator to the merchant, and allowing the merchant, without having prior direct contact with the aggregator, to activate the software to permit participation in the aggregator.

The merchant may give permission to the aggregator to provide information associated with the merchant to a user of the aggregator. The method may further include allowing the aggregator to specify data transfer parameters to influence an exchange of information between a computer associated with the merchant and the aggregator. The method may further include providing the merchant with an encryption key to permit the aggregator to verify authenticity of said merchant. Allowing the merchant to activate the software may include allowing the merchant to set the portal switch to specify data transfer parameters, services and data that may be exchanged between the merchant and the aggregator. The merchant may be provided with an encryption key to permit the aggregator to verify authenticity of said merchant.

The step of allowing the merchant to set the portal switch to specify data transfer parameters, services and data may include allowing the merchant to set the portal switch to specify at least one of an upload option, a transfer format, a pricing option, a placement, a shopping option, a data distribution, and a data lifetime.

The transfer format may be at least one of a profile format, an ASCII text, an Excel™ spreadsheet, an interoperable catalogue format, a database exchange format, and an electronic data interchange. The upload option may include a transfer protocol for the data that may be exchanged by the merchant and the aggregator. The transfer protocol may be at least one of a hypertext transfer protocol, a file transfer protocol, an xmodem protocol, a standard query language, a simple mail transfer protocol, and an open database connectivity. The pricing option may allow the aggregator to display a price of goods or services of the merchant to a user of the aggregator. The data lifetime may specify a period of time during which data from the merchant may be displayed to a user of the aggregator. The placement may influence where data from the merchant may be displayed to a user of the aggregator.

Also presented below is a portal switch, residing on a computer-readable medium, for selectively linking a computer associated with a merchant to an aggregator. The portal switch may cause the computer to enable the merchant to participate in the aggregator based on a setting of the portal switch selected by the merchant, and exchange information between the computer and the aggregator based on the setting of the portal switch. To participate in the aggregator, no direct prior contact between the merchant and the aggregator may be necessary.

The portal switch may also include an encryption key to permit the aggregator to verify authenticity of the merchant. The aggregator may specify data transfer parameters to influence an exchange of information between the computer and the aggregator. An encryption key may be provided to permit the aggregator to verify authenticity of the merchant. The setting may specify data transfer parameters, services and data that may be exchanged between the computer and the aggregator. The data transfer parameters, services, and data may include an upload option, a transfer format, a pricing option, a placement, a shopping option, a data distribution, and a data lifetime. The transfer format may be at least one of a profile format, an ASCII text, an Excel™ spreadsheet, an interoperable catalogue format, a database exchange format, and an electronic data interchange.

The upload option may include a transfer protocol for the information exchanged between said computer and the aggregator. The transfer protocol may be at least one of a hypertext transfer protocol, a file transfer protocol, an xmodem protocol, a standard query language, a simple mail transfer protocol, and an open database connectivity. The pricing option may allow the aggregator to display a price of goods or services of the merchant to a user of the aggregator. The data lifetime may specify a period of time during which data from the merchant may be displayed to a user of the aggregator. The placement may influence where data from the computer associated with the merchant may be displayed to a user of the aggregator.

The portal switch may enable the merchant to give permission to the aggregator to display data associated with the merchant to a user of the aggregator. To participate in the aggregator, no direct prior contact between the merchant and the aggregator may be necessary.

BRIEF DESCRIPTION OF THE DRAWINGS

The foregoing and other objects and advantages of the invention will be appreciated more fully from the following further description thereof, with reference to the accompanying drawings wherein like reference numbers and designations in the various drawings indicate like elements; and wherein

FIGS. 6A and 6B show participant ID and certificate options table for use with the portal switch;

FIG. 7 shows an access profile table for use with the portal switch;

FIG. 8 shows a partner table for use with the portal switch;

DETAILED DESCRIPTION OF PREFERRED EMBODIMENTS

Particular systems and methods will now be described wherein a merchant may enable (or disable) participation in an aggregator site by switching on or off as little as a single software setting, or switch. However, it will be understood by one of ordinary skill in the art that the systems and methods described herein are suitable for other applications, including linking of Web sites with search engines, which previously required bilateral agreements between the merchant and the aggregator. Accordingly, it will be understood by those of ordinary skill in the art that the systems and methods described herein are merely illustrative of the invention and not limiting in any way.

Figure 1:
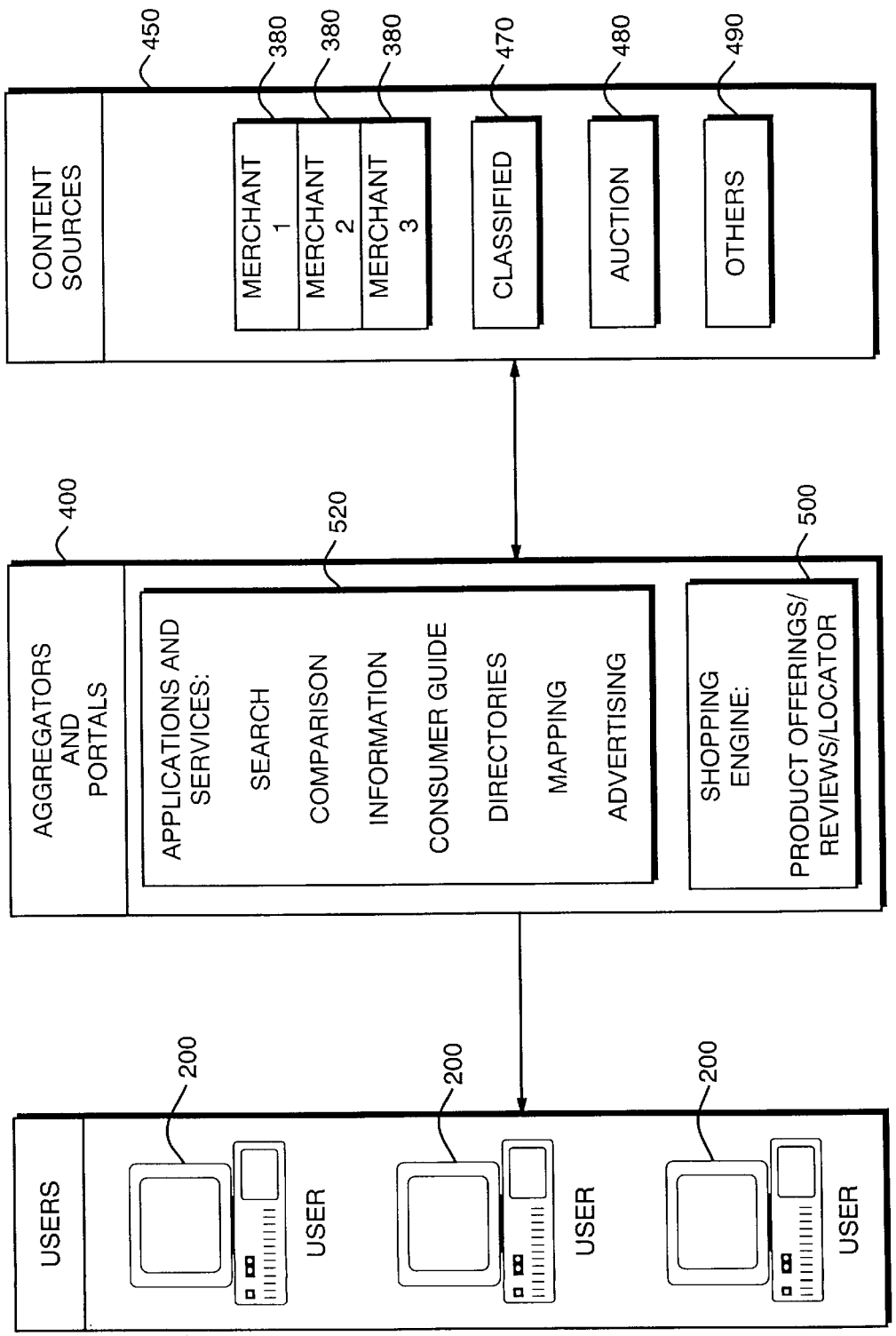
FIG. 1 is a schematic block diagram of users connected to merchants and an aggregator site via a network.

FIG. 1 illustrates an example of an existing aggregator 400 that may be used to provide a user 200 access to a number of consolidated applications and services 520. Included among such consolidated applications and services 520 are search capabilities to search for specific products or services, the ability to comparison shop, general information, such as information about the merchant, consumer guides, directories, maps and driving directions, and advertising. A shopping engine 500 may also provide information related to product offerings, reviews, and location. The aggregator 400 may also administer and/or provide access to content sources 450 which may include information from merchants 380, classified advertisements 470, items to be auctioned 480 and other information 490 of interest to people conducting electronic commerce.

The content sources 450 may be listed by the aggregator 400. The merchant 380 and the aggregator 400 may have to negotiate to decide when, how often and in which manner to update the URL links and the contents of the respective sites. The merchant 380 may have no direct control over the type and prominence of the information content displayed to the user 200 by the aggregator 400. It may also happen that some data related to the goods and services of the merchant 380 are included in the aggregator's site without the merchant's explicit permission. These data may have been mined, for example, days, weeks, or months in the past using the Internet robots described above. Additionally, the aggregator 400, instead of storing these data, may retrieve information pertaining to the merchant 380 on demand in response to a user query, with or without the merchant's consent.

Figure 2:
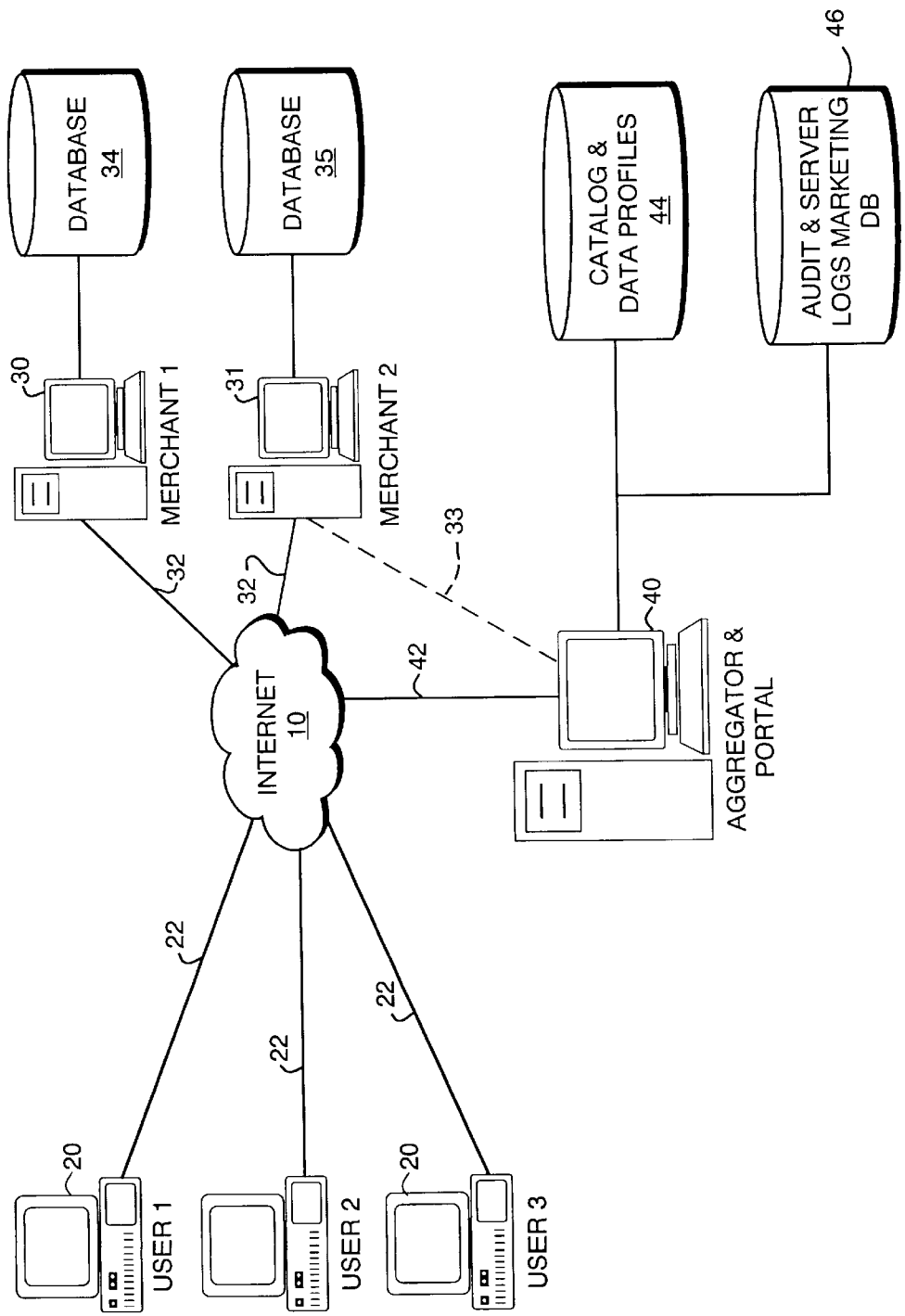
FIG. 2 is a schematic block diagram of merchants connected to an aggregator site, one of whom has access to a portal switch.

With reference now to FIG. 2, there is shown a schematic diagram of merchants connected to an aggregator site, in accordance with an embodiment of the present invention. Specifically, FIG. 2 shows a number of users 20 connected to a network 10 via user links 22, such as telephone lines, cable modems, satellite links, and intranets. An example of a network 10 is the Internet. Also connected to the network 10 via merchant links 32 are a merchant A server 30, and a merchant B server 31. Servers 30, 31 may include a merchant A database 34, and a merchant B database 35, respectively, containing catalogues, pricing, availability, etc., of the goods and services being offered by the merchant servers 30, 31 as well as other information useful to the users 20. Merchant servers 30, 31 may be connected to an aggregator 40 via the network 10. Such a connection may be effected using data links, such as an aggregator link 42 and the merchant links 32, by methods known to those of ordinary skill in the art that permit two computers to communicate to each other using a network 10, such as the Internet. The aggregator 40 may also be linked to an aggregator catalog and data profile 44 and an aggregator log and database 46.

In FIG. 2, the servers 30, 31 may be both connected to the network 10. However, unlike the merchant A server 30, the merchant B server 31 may include another link, a portal-merchant link 33, through which data may flow and be controlled by a portal switch (not shown) that is described in more detail below. The portal-merchant link 33 may be a telephone line, cable modem, satellite link, or intranet, for example. Data associated with the portal switch may be transferred via the merchant link 32 and/or the portal-merchant link 33. The link 33 may also be an Internet link, in which case it may be coincident with the merchant link 32. The portal-merchant link 33 and the portal switch (not shown) allows the participation of merchants in on-line aggregators, such as portals, used for buying and selling goods and services; for such participation, no direct contact between the aggregator 40 and merchant 38 is necessary. After the merchant gains access to the portal switch, the merchant may use the portal switch to give permission to the aggregator to display information associated with the merchant to the user 20, and to start participating in the aggregator.

Users 20 may access merchant information via the aggregator 40, which allows a user 20 to search for a desired item. The users 20 may perform this search by either interrogating the aggregator catalog and data profile 44, which may contain a number of catalog and data profiles related to the merchants 38, or by searching directly the merchant databases 34, 35 of the servers 30, 31. Merchant databases 34, 35 may only be accessible to the user 20 via the aggregator 40 if the aggregator has entered into an arrangement with the merchant controlling the merchant B server 31, and if the aggregator 40 and merchant have established a portal-merchant link 33 through which data from the merchant B server 31 may be transmitted. For merchant servers 30, 31 and merchant databases 34, 35 accessed by the user 20, the aggregator 40 may maintain an aggregator log and database 46 containing auditing, server, and marketing information, such as the number of hits on a specific merchant Web site, and the time duration during which the Web site was viewed. To preserve confidentiality, this information may be combined so as to not reveal specific information about any one particular merchant.

Figure 3:
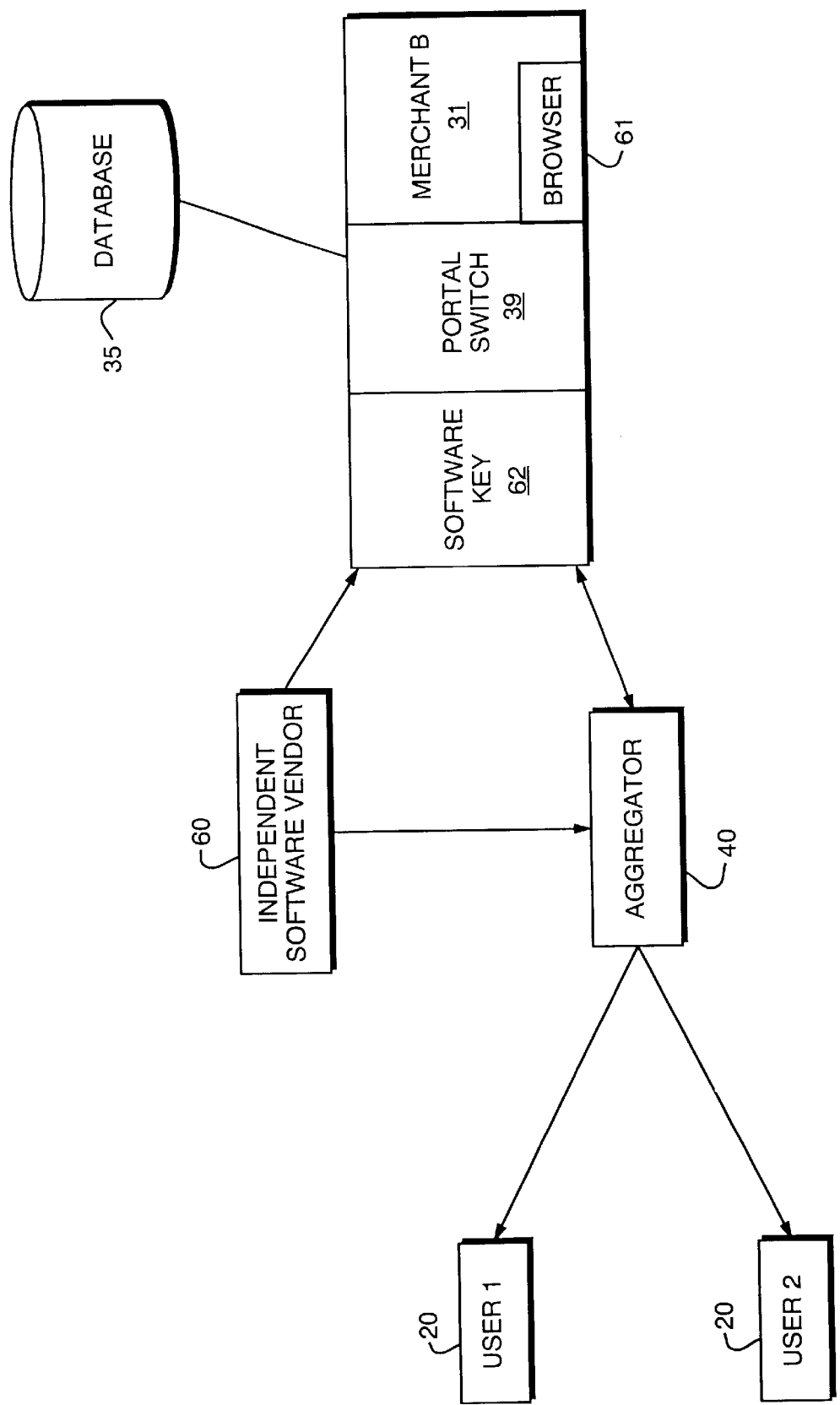
FIG. 3 is a schematic block diagram showing the interrelations of a merchant with a portal switch, an independent software vendor, and an aggregator.

Referring now to FIG. 3, the aggregator 40 and the merchant B server 31 are shown connected by a portal-merchant link 33, which helps a merchant interact with an aggregator in accordance with principles of the current invention. Also shown is a portal switch 39 which allows the participating merchant to control the flow of data to the aggregator 40. In the embodiment represented by FIG. 3, most of the portal switch 39 resides on the merchant B server 31; in other embodiments, however, part or all of the portal switch 39, including hardware and software, may reside elsewhere, such as at the aggregator site, or elsewhere. The portal switch 39 may be linked with the administration of the merchant B server 31 and/or with other commercial software residing on the server 31 and/or the merchant B database 35.

The participants, i.e., the merchant 38 having a merchant B server and/or aggregator 40, in the operation of the portal switch may purchase the software for the portal switch 39 from an independent software vendor 60, from the aggregator 40 (in which case the software default settings may be preconfigured to the aggregator's default parameters for ease of use), or from a clearinghouse system (not shown). The clearinghouse system can be any system that actively searches, on the network 10 for example, for new portal switches, and stores information about them to better serve participating merchants and aggregators 40. The participants of the operation of the portal switch 39 may purchase information stored on an appropriate medium, such as a CD-ROM available off the shelf, or on the hard drive of a server from which the participants may download the information.

In one embodiment, the portal switch 39 may be supplied to the participating merchant having a merchant B server 31, by an independent software vendor 60. The independent software vendor 60 may also provide the software protocols of the portal switch 39 to the aggregator 40 through a prior agreement between the vendor 60 and aggregator 40. As discussed further below, the portal switch 39 may also include data tables with default values understood by the aggregator 40 for how and when catalog and profile information can be transferred. Participating merchants may change the default values of various individual settings to influence how their information is being, transferred, configured and displayed at the aggregator's site.

The portal switch 39 may be used with aggregators 40 that mine data over a time span, or with aggregators 40 that obtain information on demand in response to a query by a user 20. In either case, the portal switch 39 may control the flow of data accessible to a user 20 via the aggregator 40. For example, the portal switch 39 may dictate the type, frequency, and manner in which data is displayed to a user 20 who utilizes an aggregator 40 to obtain information about a particular product or service. The software controlling the portal switch 39 may reside in part or in whole at sites that include the merchant B database 35, the aggregator log and database 46, or both. Moreover, this software may run on a server operated by the aggregator 40, or on the merchant B server 31, or on both.

To be able to set options for the type, frequency, and presentation of the data supplied to the aggregator 40 by the merchant, the merchant may need to have access to a software key 62. This software key 62 allows the aggregator 40 to authenticate the merchant before engaging in any communication with the participating merchant. Conversely, the aggregator may have a key (not shown) which the merchant may use to authenticate the aggregator before engaging in communication. The merchant may choose and transmit the portal switch 39 settings by utilizing an Internet browser 61, as is detailed below.

Figure 4:
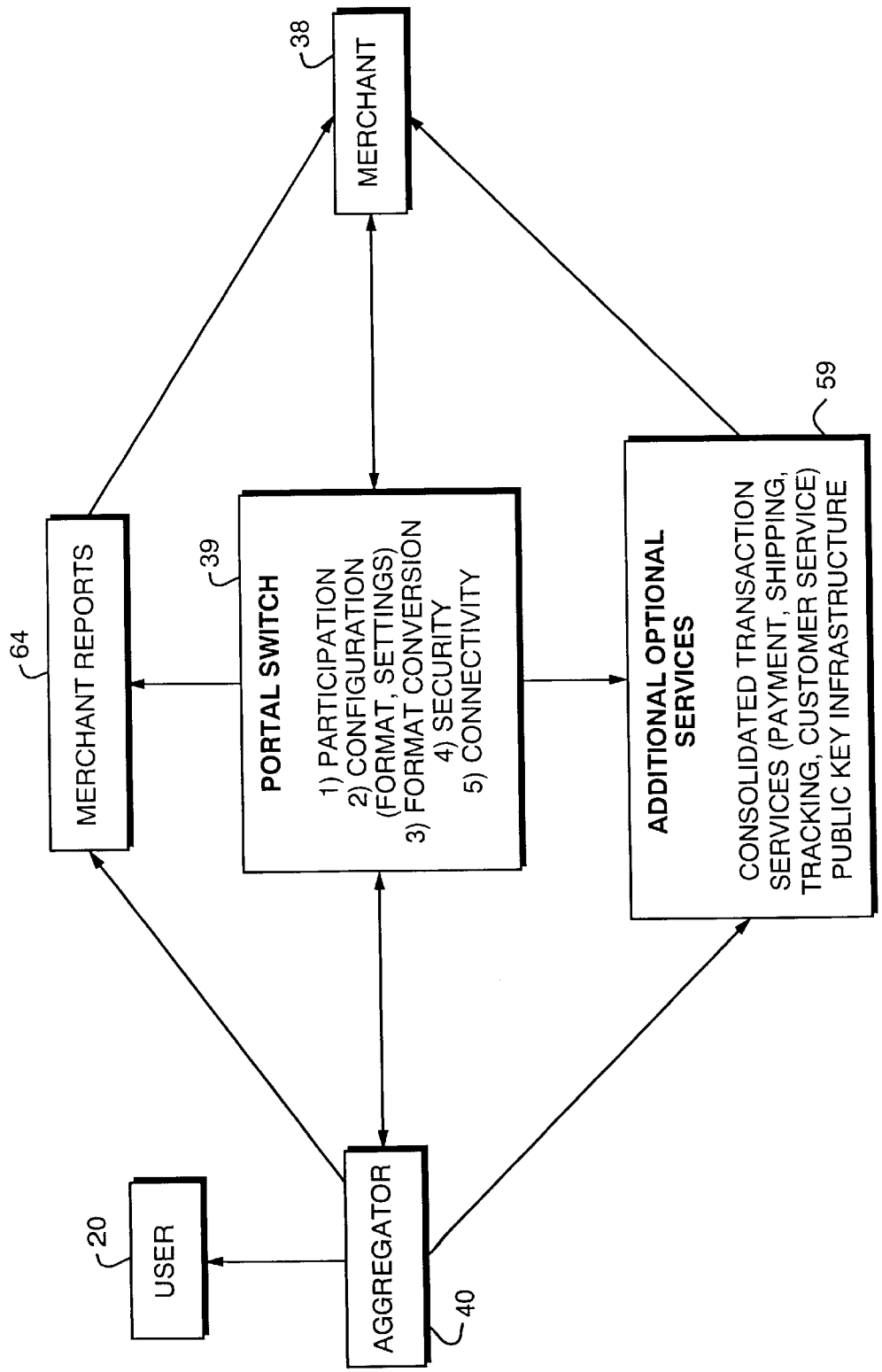
FIG. 4 is a schematic diagram illustrating the direction in which and the type of information exchanged with the help of the portal switch.

Referring now to FIG. 4, the portal switch 39 controls aspects of the interaction between the aggregator 40 and a participating merchant having a merchant B server 31 (not shown) in accordance with principles of the present invention. When the merchant 38 activates the portal switch 39, the aggregator 40 may obtain the permission of the merchant to display the goods and services of the merchant alone or with offerings from other sites, and to cache or copy portions of the merchant's Web site relating to products and services, such as product data, description and pricing, as well as images. The aggregator 40 may also obtain the merchant's permission to extract identifying information about the merchant 38 from the merchant B server 31, and other resources where such information may be found. The setting of the portal switch 39 may also indicate to the aggregator 40 the information which may be furnished to users 20 to facilitate commercial transactions. In return, the aggregator 40 may advertise the merchant's goods, services and appropriate ancillary information in response to queries by interested users 20 in accordance with a default agreement stipulated by, for example, a software license agreement for the portal switch 39.

As also indicated in FIG. 4, the portal switch 39 may help perform a number of functions to facilitate exchange of data between a merchant 38 and the aggregator 40. As mentioned above, activation of the portal switch 39 by a merchant 38 may enable participation of the merchant 38 in the Web site of the aggregator 40, and data sharing between the merchant 38 and aggregator 40. The portal switch 39 may interrogate the system on which it runs to determine the best default settings. The merchant 38 may then only have to answer one question upon activation of the portal switch 39, for instance, "Is the merchant willing to share information, such as may reside in the merchant B database 35, with the aggregator 40?" The various possible switch settings that control the type, frequency, and presentation of the data are discussed further below. The portal switch 39 may furthermore allow the merchant 38 to configure and control participation in the site of the aggregator 40 without requiring prior direct contact with the aggregator 40. As part of the configuration routine, given access to the TCP/IP settings of the computer on which the portal switch 39 resides, the portal switch 39 may let the merchant 38 negotiate with the aggregator 40, for example, such data transfer parameters as the transfer format, the transfer protocol, the transfer control and the transfer frequency.

The transfer format may include ASCII text with comma-separated values, Excel™ spreadsheets, interoperable catalogue formats, database exchange formats, profile formats, and EDI (electronic data interchange). Transfer protocols may include hypertext transfer protocol (http), file transfer protocol (ftp), simple mail transfer protocol (smtp), open database connectivity (ODBC), standard query language (SQL) and responses, and various modem protocols, such as xmodem. Transfer control can either rest with the aggregator 40, wherein the aggregator 40 requests data from the merchant (pull), or with the merchant 38, wherein the merchant 38 voluntarily transfers data to the aggregator 40 (push). The transfer frequency may be selected so that data are transferred between the merchant 38 and the aggregator 40 on demand, at a defined time interval, or both.

The portal switch 39 may also perform format conversions, whereby the merchant's information can be displayed differently at the aggregator's site. For example, information about the merchant's goods and services may reside on the merchant B server 31 in the form of a spreadsheet, while the aggregator 40 displays the corresponding information as part of an aggregator's Web page. Other format conversion will be apparent to those skilled in the art.

The portal switch 39 may also enhance the security aspects of commercial transactions between the merchant 38 and the aggregator 40 by facilitating distribution of private/ public keys for encrypting sensitive information, such as credit card numbers, and verifying the authenticity of a party. Most encrypted transactions use a combination of private keys, public keys, secret keys, hash functions, and digital certificates to achieve authentication (of sender and recipient), confidentiality, message integrity, and non-repudiation by either party. Each sender (the aggregator 40 or the merchant 38) and each recipient (the merchant 38 or the aggregator 40) has a private key, known only to him/her and a public key, which can be known by anyone. Each encryption/decryption process requires at least one public key and one private key, and both must be from the same party. In the present example, the merchant's public key/ private key pair may be generated by or reside within the portal switch 39. The sender's and recipient's public keys may be validated (signed) by a certificate authority to produce a digital certificate. Encryption processes of this type are known in the art and enable, for example, the aggregator 40 to securely transmit confidential user information to the merchant and to verify the identity of the merchant.

As also seen in FIG. 4, the aggregator may use the portal switch 39 to offer additional optional services 59 to the merchant. These services may include informational and consolidated transaction services, such as payment transactions, shipping, tracking and customer service, which may be stored in the aggregator catalog and data profile 44, and/or the aggregator log and database 46. The data of these additional optional services 59 may also be encrypted, as discussed above. Merchant reports 64 may be transmitted to the merchant 38 in real time or queued, depending on the transfer protocol employed. An example of a queued process includes email, where the reports 64 may be stored until the merchant retrieves the data.

Figure 5:
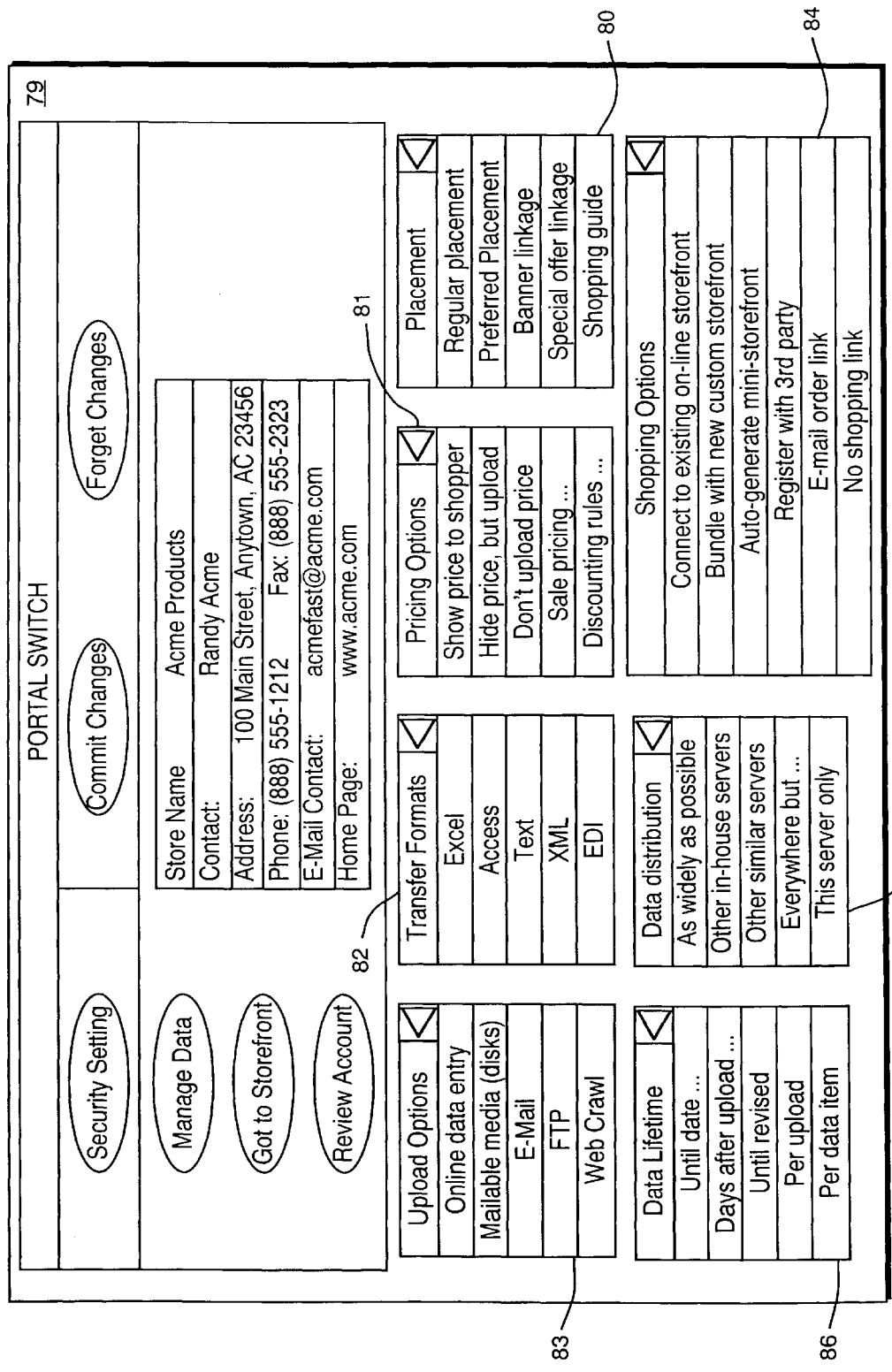
FIG. 5 illustrates an interface through which various settings of the portal switch may be selected.

Shown in FIG. 5 is an example of a portal switch interface 79 that allows the merchant 38 to use an Internet browser 61 to submit information for the operation of the portal switch 39. Other interfaces may employ other means, such as email, to convey this information. Various options for the portal switch 39 may be available to the merchant 38, and some examples are provided in connection with FIG. 5. Placement box 80 is used to instruct the aggregator 40 to present the merchant's data to the user 20. Pricing option box 81 is used to instruct the aggregator 40 to disclose information to the user 20 related to the pricing of a product or service. For example, the merchant 38 may choose to not show a price to the user 20. Transfer formats box 82 allows the merchant 38 to specify the transfer format for the data conveyed to the aggregator 40. Supported formats may include ASCII text, the format Excel spreadsheets, interoperable catalogue formats, database exchange formats, profile formats, and EDI. Upload options box 83 is used to instruct the aggregator 40 to transmit data by using various transfer protocols. Transfer protocol options include http, ftp, smtp, ODBC, SQL and responses, email, mailable media, such as disks, and various modem protocols, such as xmodem. Shopping options box 84 allows the merchant to specify the shopping options available to the user when using the aggregator 40. The options include connecting to an existing on-line storefront, bundling with a custom storefront, auto-generating a min-storefront, registering with a third party, providing an email order link, and providing no shopping link. Data distribution box 85 allows the merchant to choose the distribution of the data. Options include distributing data to as many servers as possible, other in-house servers, other similar servers, and to one server only. An option may also exist to list servers to be excluded. Data lifetime box 86 allows the merchant to select the period during which the merchant's data may be displayed. Options include until a specified date, until revised, and for a certain number of days after an upload of data.

The software of the portal switch 39 may include an application, such as a Java application, that is distributed to the merchant. This application may be implemented as a Java applet in a web browser, interacting directly with an aggregator 40, or clearinghouse system that acts as a proxy. If a proxy is used, the Java application could run at the clearinghouse system on behalf of the merchant who may have an interface to the clearinghouse system. The information conveyed by the merchant 38 to the aggregator 40 could be stored (or a copy cached) at the clearinghouse system or aggregator 40. In such case, the merchant 38 may maintain a master copy of his application, preference, and keys locally. Normally, a Java application runs in an environment outside of a particular browser to allow it to interact with multiple web sites.

In systems where multiple merchants coexist, a central default location may contain files that can be used as templates to ease the merchant experiences. These templates may be copied to the merchant's home directory for customization. The participant identification may be partially filled out in such a system. The aggregator 40 and independent software vendor 60 may also maintain libraries of templates which may be accessed when appropriate.

Shown in FIGS. 6A and 6B is a participant identification and certificate options table 799. The information in this table 799, which may be input by the participant using an interface that is similar to the portal switch interface 79 shown in FIG. 5, corresponds to options for the setting of the portal switch 39. (The options in FIGS. 6A–8, which modify, supplement, or coincide with the options shown in FIG. 5, may be available in various embodiments). In busname row 800, information pertaining to the business name of the merchant may be supplied. In comnames row 801, information pertaining to any optional alternative names may be supplied, such as colloquial moniker for the merchant. In server row 802, information pertaining to a web server name may be supplied. In duns row 803, information pertaining to Dun & Bradstreet™ identifier may be supplied. In contact row 804, information pertaining to any contact information may be supplied, such as a phone number and email address. In products row 805, information pertaining product keywords may be supplied. In date row 806, information pertaining to the date that the business was established may be supplied. In jurisdiction row 807, information pertaining to the state or jurisdiction in which web business is incorporated or registered may be supplied. In states row 808, information pertaining to the state or jurisdiction in which business has a presence for tax purposes may be supplied. In type row 809, information pertaining to the type of business (as categorized in the yellow pages or Dun & Bradstreet™) may be supplied. In authorization URL row 810, information pertaining to the pointer to the portal switch 39 access port may be supplied. In ID certificate row 811, information pertaining to an ID certificate may be supplied. In portal switch certificate row 812, information pertaining to the certificate authorities, such as Verisign™, may be supplied.

For rows such as 800, 801, 803, and 806, the merchant may type the relevant information in the provided fields. Where formatting of standard address portions (such as address, phone number, and e-mail in the contact row 804) may be required, the formats published in the P3P1.0 specification (Platform for Privacy Preferences) at http://www.w3.org/TR/P3P may be used. If Internet Explorer is used as a web form interface, automatic string completion may be used to facilitate data entry.

For access to the Dun & Bradstreet™ Web site, http://www.dnb.com, an agreement may be arranged to allow one-time access to a database. In one embodiment, any costs incurred as a result of arranging such an agreement may be paid by the independent software vendor 60 in an aggregate arrangement.

In FIG. 7, an access profiles table 820 is shown that stores initial values of local information that sets the participant and partner's capabilities and preferences. (When a participant is a merchant, the partner refers to the aggregator or group of aggregators with which the merchant may exchange information with the help of the portal switch 39. Conversely, when a participant is an aggregator, the partner refers to the merchant or group of merchants with which the aggregator may exchange information with the help of the portal switch 39.) In participant/partner row 821, information to help identify the participants and partners to which the access profiles table 820 applies may be provided. In transport method row 822, information pertaining to the transport method available along with transport addresses for Request For Comments (RFC) 822 email, TCP/IP ports, and/or UDP port numbers, for example, may be provided. In transfer protocol row 823, information pertaining to supported transfer protocols, such as ODBC, http, or ftp, may be provided. In access format row 824, information pertaining to supported data formats and translation tables, such as Extensible Markup Language (XML) and XML schema, comma separated values, and Excel™ spreadsheets, may be provided. In query format row 825, information pertaining to any special query formats may be provided. In parse format row 826, information pertaining to any parsing code may be provided. The type of parsing code may include Tool Command Language (TCL) with a set of TCL commands, or Java with Java code to translate into the field data referred to in field data row 827, for example. In the field data row 827, information pertaining to supported data fields, such as product identification, BarCode, description, price, manufacturer, and detailed feature data, may be provided. In time-of-day row 828, information pertaining to time-of-day restrictions may be provided. In frequency row 829, information pertaining to the update frequency may be provided. For example, if the access profiles table 820 corresponds to the merchant options, the frequency row 829 may contain information pertaining to the frequency that information is provided to the aggregator 40. In quantity row 830, information pertaining to the minimum and/or maximum number of records to be delivered may be provided. For example, if the access profiles table 820 corresponds to the merchant options, the quantity row 830 may contain information pertaining to the number of records that is delivered at a time to the aggregator 40.

The participant, i.e., the merchant 38 and/or aggregator 40, may utilize an interface, such as one similar to the portal switch interface 79, to input the data represented in the access profiles table 820. The interface may provide listed options for the merchant 38 to choose, for example, to facilitate the merchant's task. In one embodiment, if the merchant 38 does not choose an option, some default options may be assumed.

Referring to FIG. 8, a partner table 840 is shown. When a participant is a merchant, the partner refers to the aggregator or group of aggregators with which the merchant may exchange information with the help of the portal switch 39. Conversely, when a participant is an aggregator, the partner refers to the merchant or group of merchants with which the aggregator may exchange information with the help of the portal switch 39. Partner table 840 helps in the security of the operation of the portal switch, and includes information that describes a partner using an Access Control List (ACL). The partner table 840 may be used to identify groups of potential partners for data exchange, and to determine which access profiles may apply to a specific merchant and aggregator pair. In partner listname row 841, information pertaining to the identification of the group of partners may be provided. In certificate mask row 842, information that pertains to a mask that identifies fields in the partner's participant certificate, and indicates whether he/she is a member of this group may be provided. A mask may be a filter that allows automatic inclusion of participants meeting the specified criteria in the partner table 840. In explicit certificate list row 843, information pertaining to certificates made explicit by having a copy of, or a pointer (from a "trusted" URL) to each certificate may be provided. In implicit certificate list row 844, information pertaining to certificates that have been granted or denied access under this mask may be provided.

When a certificate is provided, the certificate may first be matched against information provided in the partner listname row 841. In one embodiment, when a certificate is provided, the certificate is first compared to the BLACKLIST and BLACKLISTEE data referred to in row 841, then against a partner table 840 explicitly containing the corresponding partner certificate. If no explicit match is found as a result of comparing these certificates, the certificate may be examined to see if it satisfies the conditions specified in the data corresponding to the certificate mask row 842 for each partner table provided, starting with BLACKLIST and BLACKLISTEE and so on through the partner tables ending with the DEFAULT partner table referred to in row 841. When the conditions for match are found, the certificate is assigned to that group. If not explicitly present, the certificate may be added to the implicit certificate list referred to in row 844 for the matching partner table.

Implicit certificates are a refinement so that a user can track who has actually been interacting with the site. BLACKLIST describes partners with which the participants do not wish to communicate. BLACKLISTEE describes partners that have blacklisted the participant, so that contact with those partners is not initiated by the BLACKLISTEE participant.

A similar set of lists may be provided by the independent software vendor 60 to define special purpose partner lists including clearinghouses, certificate authorities, and reflector sites, as well as lists advertising selected aggregators and merchants. Such preconfigured lists may help the participant to get started.

Some of the information provided by the participant for the participant identification and certificate options table, the access profiles table 820, and/or the partner table 840 may be information that the participant is willing to share with anyone, without the intervention of the portal switch 39. For example, if a web connected host sends a search string URL to the participant web site, addressing a search engine through Common Gateway Interface (CGI) or other active mechanism, the requestor receives back a page listing product information that matches that search string. The merchant may use tools known to one of ordinary skill in the art to translate portions of the merchant B database 35 into HyperText Markup Lanuage (HTML), which may then be accessed by other parties on port 80 with hypertext transfer protocol (http). In one embodiment, the storefront toolset provided with the Site Server Commerce Edition 3 product from Microsoft™ may be used.

The interpretation of the page listing may be performed with the help of the portal switch 39. The portal switch 39 may parse, and add supplemental information to the page listing information. For example, the portal switch 39 may add the availability and price of goods or services mentioned in the page listing. The format of the search string is specified in the query format referred to in row 825. An optional parse routine is listed in the parse format referred to in row 826, and the resulting data is described by the field data referred to in row 827. (The default field format may be as described above to provide a common language.)

After the portal switch software collects specifications of the participant's computer, the information may be verified with the interactive help of a reflector site. For each access profile, the portal switch software may ask that the reflector site send or receive a request and verify that the access path is available and correct.

In one embodiment, the application that is the portal switch 39 may have a unique port number associated with it. The aggregator 40 may invoke the portal switch 39 on the merchant B server 31, for example, by including the port number. For the portal switch access URL, the software may enter the portal switch operational process in a table such as the inet daemon's table and have calls to that TCP/IP or UCP port invoke the portal switch process. If the portal switch access URL is e-mail, then when mail is sent to that e-mail address, the portal switch 39 should be invoked to process it. In one embodiment, the participant is able to supply his own e-mail address and manually feed the portal switch e-mail message to the portal switch application.

When the portal switch access URL is declared, the initialization service may connect to that URL, and utilize a reflector to test whether a connection is present. A default reflector service may be maintained by the ISV or clearinghouse with known addresses.

Similarly, the independent software vendor 60 may have an arrangement with one or more certificate authorities (such as Verisign™) to manage certificates, or act as a certificate authority itself. A subscriber access code or "token" good for one use at such a certificate authority may be included in the package.

In one embodiment, the software may generate a public/private key pair, and create a self-signed X.509 certificate, using a package such as BSAFE produced by RSA™. This certificate is then registered with a certificate authority and the private key is secured with a password on a removable disk (or PC Card or SmartCard token) for the participant's protection (with a backup copy on a separate removable disk or token). In this manner, only the participant may have the original identity private key and the participant may be responsible for protecting it.

Figure 9:
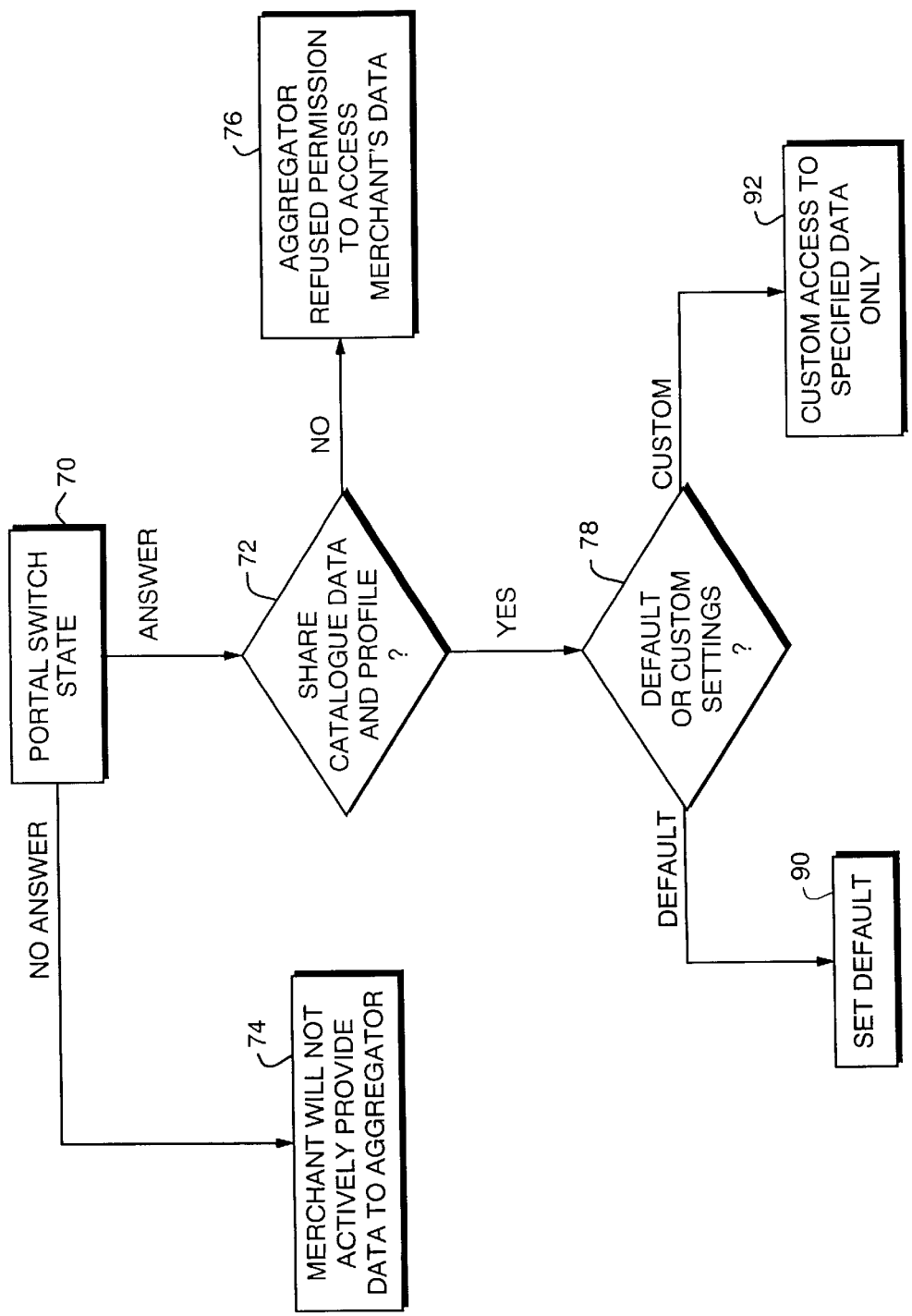
FIG. 9 is a flow diagram of the installation and operation of the portal switch.

Referring now to FIG. 9, the portal switch state 70 may determine the level of participation of the merchant 38. If the portal switch 39 does not answer because the merchant 38 is offline, the merchant B server 31 does not actively participate in providing data to the aggregator 40, step 74. In such case where the merchant 38 is offline, the aggregator 40 may still collect and display data from the merchant site. In the case where the merchant B server answers, the merchant 38 can set the portal switch 39 to enable or disable sharing of catalogue data and profiles located in merchant B database 35 with the aggregator 40, step 72. If the merchant 38 disables data sharing in step 72, then the aggregator 40 is refused access to the merchant B database 35, step 76.

Otherwise, the merchant 38 can set the portal switch 39 to "default," as referred to in row 841, or to a custom setting, step 78. The merchant may set the portal switch to "default" by comparing an access profile sent by the aggregator with the access profile selected by the merchant for that aggregator and returning (and storing locally) an access profile containing common characteristics. The default setting, step 90, may include a number of services to which the software controlling the portal switch 39 defaults after a power-down. The default setting may also reflect the most common operating conditions and settings. The custom setting, step 92, may include specific services which are tailored for special situations, for example, by limiting or extending aggregator access to certain databases.

Another situation may arise where the portal switch 39 operates, but the merchant B server 31 is not turned on or connected to the network. The switch 39 will then request that information to be exchanged between the merchant and the aggregator 40 be queued, and wait to transmit the respective information until the merchant B server 31 is connected. For example, dial-up merchants may agree via the portal switch settings to perform or queue sales at the aggregator's site. However, the authoritative source for the merchant's catalogue and associated sales operations may remain at the merchant's site.

Figure 10:
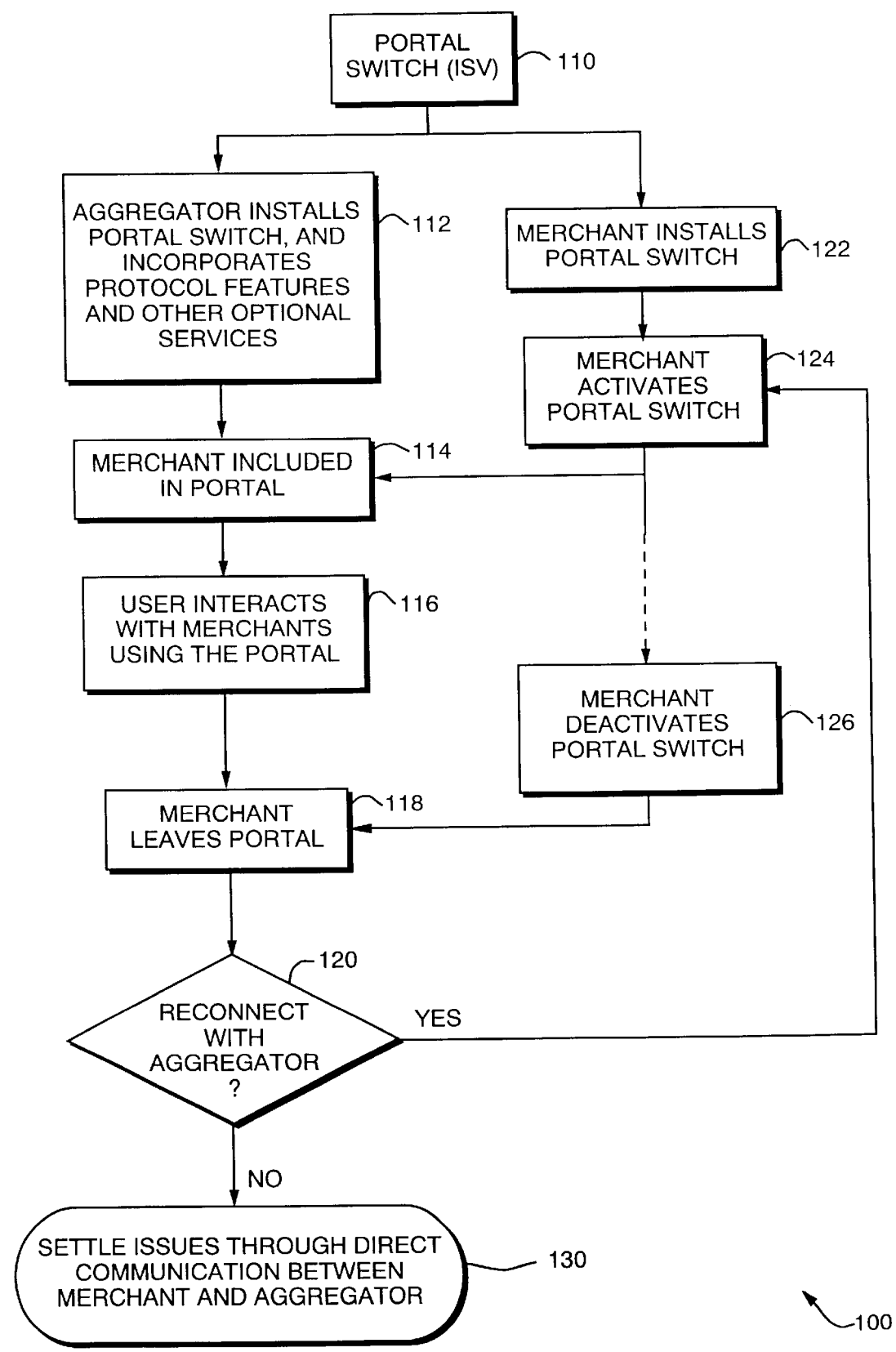
FIG. 10 is a flow diagram outlining some of the steps in the operation of the portal switch.

Referring now to FIG. 10, a process flow 100 shows the set-up of portal switch software 110 incorporating the portal switch 39. The portal switch 39 may be provided to the merchant 38 by an independent software vendor 60 and customized for the merchant's business applications. As mentioned above, the portal switch 39 has default settings, but also understands the semantics of data structures to translate local data structures into other formats or into a common format. An aggregator 40 may need to instal part or all of the portal switch 39, and incorporate into its server structure protocol features to provide a seamless transition between the software from the independent software vendor 60 and the aggregator's application program interface (API), step 112.

The merchant instals part or all of the portal switch 39 on his server 31, step 122, and may decide to activate the portal switch 39, step 124, to participate in an aggregator's Web site. It should be noted that the activation of the switch may be sufficient for the merchant's participation and that no prior arrangement, contractual or otherwise, may be required between merchant 38 and aggregator 40 to begin electronic commerce transactions. However, a contractual relationship between the merchant 38 and the aggregator 40 may, in addition, be implicit in the software license agreement between the merchant 38 and the independent software vendor 60.

By activating the switch in step 124, the merchant participates in the aggregator's Web site by, as discussed above with reference to FIG. 4, allowing the aggregator 40 to access the merchant B database 35 and using the additional optional services 59, step 114. The user 20 interacts with the merchant 38 via the aggregator 40. Depending on the settings selected for the portal switch 39, as outlined above with reference to steps 72 and 78 of FIG. 9, the user may have access to all or only a portion of the merchant's catalogue data, and the aggregator 40 may also provide consolidated transaction services, such as billing, clearing payments, tracking, and customer service.

The merchant may deactivate the portal switch 39 at any time, thereby withdrawing from the aggregator's Web site/portal, step 118. From that time on, the aggregator 40 no longer has the permission of the merchant to collect or use data from the merchant's site, whether or not the aggregator is still able to collect and display data from the merchant's site. In addition, the aggregator 40 may still have access to any data stored on the aggregator catalog and data profile 44 and/or aggregator log and database 46 pertaining to the merchant 38. The merchant 38 may decide to reactivate the portal switch 39 at any time without prior negotiations with the aggregator 40, step 120, in which case the process returns to step 124. Otherwise, pending transactions, open invoices and the like may have to be handled manually or may have to wait until the next activation of the portal switch 39 by the merchant 38, step 130. Such details may be specified and incorporated as parameters in the switch settings (see FIGS. 5–8).

The software for the portal switch 39 may include a series of screens helping the merchant 38 and/or aggregator 40 to a) identify each other, and assert that identity publicly, either through self-assertion or with the digital signature of a certificate authority; b) identify the participant's (merchant and/or aggregator's) product or service data storage and retrieval system, its capabilities, access methods, and availability; c) create or verify descriptions of partners (merchants and/or aggregators) with whom one is willing to exchange information (as well as exclusion lists of unwanted partners); d) establish preferences and limits on data exchange with partners matching a particular description; e) and, optionally, register these preferences with a clearinghouse system.

When the initial parameters are set up, the software application for the portal switch 39 negotiates actual parameters between the participant and partners who meet the criteria set for data exchange and then enables or directs the data exchange process. In one embodiment of the invention, the "open" operation, the portal switch 39 may be used for the participant to tell other partners (other participants) how and when to access the participant's data and how to interpret the information received. The interfaces are freely available, with any access controls being applied by security mechanisms independent of the software of the portal switch 39. In "open" operation, partners access the portal switch 39 primarily for information about how to access data, but actually access the data through existing mechanisms. For easy access, the portal switch 39 may be available on a well-known TCP/IP or User Datagram Protocol (UDP) port registered with the Internet Assigned Numbers Authority (IANA). There may also be a default port associated with the portal switch 39 if none is explicitly supplied.

In a second embodiment of the invention, the "proxy" operation, software of the portal switch 39 may be used like the software of a proxy server, and to access data on behalf of the requesting participant. The proxy operation may allow finer-grained restrictions than the open operation. For example, the proxy operation may allow an external participant to access a database via Open DataBase Connectivity (ODBC), but limit the format of the SQL statements utilized by the external participant, or filter the information that is returned.

When invoked, the portal switch 39 may:
1) determine the system information, the operating system first, then check for existing preference files in (a) the current directory and (b) the default directory for the system (for example, file:/PROGRAMS/PORTALSW/aggregator.dat, or http://home.merchant.com/merchant.dat); and
2) put up a screen with a default directory appropriate to the operating system, display the default location (with participant name if an existing file is present), and request that the user verify this as the preference file to be used or specify a directory (which is set to be current directory) and allocate or open files in which to store the participant's preferences, one for each data structure. If no file for a data structure exists in the specified directory, the participant may be asked for one to use. Templates accessed from the web may be copied, and any changes written to a local file of the same name in the current directory.

When the portal switch application is first loaded, data structures may be incomplete, or not yet initialized. To complete the data structures, the application may:

1) call up the partner table 840 to determine the preferred or proper VENDOR, REFLECTOR, CLEARINGHOUSE and CERTIFICATE AUTHORITY;
2) if the participant certificate is not signed, put up a series of screens to gather the missing participant ID information, generate a public/private key pair, and, in one embodiment, submit the certificate to a certificate authority, and post the returned certificate to merchant-.dat or aggregator.dat in the current directory;
3) notify the participant of the rules for participation in the portal switch method, and require the participant to acknowledge and agree to abide by these rules as a condition for using the portal switch 39;
4) if the access profiles have not been completed, display a series of screens with preconfigured defaults, starting with the DEFAULT list and the BLACKLIST of the partner listname row 841.

At each invocation, the user may want to change a table. Accordingly, the application may prompt the user to add, modify, or delete a table. Changes may be kept in temporary files and not moved to the permanent files until the participant key is present and the participant has confirmed the changes. When each file is moved, a digital Message Digest 5 (MD5) hash of the file may be made and digitally signed using RSA. The resulting signatures may be stored in a separate file, verify.dat. (These signatures may be used to verify that a given data file matches the configuration specified by the participant and has not been altered.)

In one embodiment, at the end of each configuration sequence, modified data in the access profile table 820 may be tested against the reflector site. This may be accomplished by replacing the partner list with the reflector site. (Optionally, a reflector or clearinghouse site might also check the matching parameters against a set of known sites to provide a return sample of what partners match the specifications.)

As another aid in testing, the participant may develop or modify an explicit set of partner tables 840 that describe partners that the participant may want a specific filter to include or exclude. The application may determine if the specified access profile is producing results that the participant finds satisfactory.

There are several methods by which a participating merchant 38 may contact an aggregator 40. The merchant 38 may determine which aggregator 40 may contact it through the profiling. To initiate contact, the portal switch application may send a copy of the preferences to a CLEARINGHOUSE. The CLEARINGHOUSE runs the templates against the certificates of known AGGREGATORS, and sends the merchant's certificate to those aggregators to inform them that the merchant is willing to exchange information with them. Alternatively, at the merchant's discretion, the merchant 38 may be notified of matching AGGREGATOR certificates. The clearinghouse may update these at a specified interval.

Another method by which a participating merchant 38 may contact an aggregator 40 is via a default port. A merchant 38 and aggregator 40 that use the default port can find each other by web-crawling, a technique which seeks out new sites and checks the default port to see if it is the contact method. In this method, one participant sends the other the originator's certificate via the default port.

Another method by which a participating merchant 38 may contact an aggregator 40 is through negotiation. Once one party, the initiator, has sent an introductory certificate to the other, negotiation may begin. The recipient first checks blacklists. If the initiator is on the recipients blacklist, the initiator's certificate is returned with a note that it should be added to the initiator's blacklistee list and that the initiator should cease soliciting the recipient. If the initiator is on the recipient's access profiles table 820 (or the DEFAULT access profile), then the recipient may return the recipient's certificate along with a copy of part or all of the access profile. The initiator site may select an access method from the list provided in the recipient's access profiles table 820. A modified access profile may be returned to the recipient indicating the method the initiator intends to use.

Access profiles may be negotiated with the help of an appropriate algorithm. To see if two parties are compatible, in an access pass, it may be confirmed that each party's certificate is explicitly listed in one of the partner profiles of the other party, or that it passes the access profile's filter criteria. The first matching profile may be used. If either party has blacklisted the other, the parties are not compatible. In a feature pass, a list of features, such as access method, and access format may be checked to see if the party's features are compatible. The highest item on the merchant's access profile that is also supported by the aggregator's profile may be chosen. If they are not compatible, another access profile may be checked, although the merchant 38 may be able to forbid this. If they are compatible, an access profile may be produced that agrees with both parties as an operational profile. The profile may be released to both parties as the agreed method of functioning. (If there are secondary agreements, they may be listed in the joint access profile as well.) The resulting access profile may be matched against known working (or non-functional) profiles. (These profiles may be generated by asking the merchant's portal switch to run them by a reflector switch, or manually maintained by the matching party.) Better matching algorithms may be used, or invented to make one clearinghouse better than another. Input to the matching algorithm are two lists of access profiles, one for the aggregator, and one for the merchant. (If the match takes place at one location or the other, the match may be between one access profile or access profile list submitted by the remote location and the local access profile list).

Data exchange between the merchant 38 and aggregator 40 may take place outside the portal switch 39, when for example, the data is publicly available. Participants or users that are informed through the portal switch 39 that their attentions are not desired may be asked to not perform data mining operations through a portal switch agreement. Data mining performed by these participants or users on public interfaces may amount to copyright infringement.

Data transfers may occur via pulling or pushing. The aggregator 40 may pull data from the merchant 38, either on a schedule or on demand. Pull actions may include queries against a structured database (e.g. ODBC), queries against a web search engine, and fetching a structured file (and parsing instructions or code). The merchant 38 may also periodically push data to the aggregator 40. Pushing actions may include the merchant transferring data to the aggregator 40 using email or ftp to transfer an Excel™ spreadsheet, or posting updates to a structured database on the aggregator 40. Although the same technologies may be used for push and pull, the distinction may refer to who initiates and controls the transfer of data.

Some interfaces may require better access control than the public interfaces provide. In such cases, the portal switch application may be extended to act as a proxy server, which may accept only connections approved by the portal switch 39. The portal switch 39 may determine who may access the proxy server. Additional proxy specific filters may be added to the appropriate access profiles table 820. For example, a database access proxy may limit access to the database, and specify the kinds of queries that may be made to that database. The database access proxy may also forbid access to specific tables, and control log ins to the database with a specific set of user privileges. This would allow ODBC to be used (a) without making a full web-accessible ODBC (the advantage being more security and reducing bugs), and (b) making a limited ODBC accessible through a firewall that is configured to forbid access to ODBC ports.

In one embodiment, Java may be used to write the software of the portal switch 39, since it may have desirable portability. Some or all of the portal switch 39 may be more easily written in "C" on an operating system platforms, such as Unix variants, to better influence the operating system's native networking code and interact with security software. The hardware and operating systems upon which the portal switch may run may include Sun™ workstations with Solaris™, Pentium™ PCs with Windows 95/98/2000™, Windows NT 4™, or Linux. On Solaris™, for example, the portal switch 39 may interact with security software such as tcp-wrapper, which controls access to specific ports by IP address, to open or close those ports to specified partners.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A computer-implemented method to permit a merchant to selectively participate in an aggregator, comprising:
    (a) providing software recognized by the aggregator to the merchant;
    (b) allowing the merchant, whose information has not been made available to the aggregator, to activate the software;
    (c) activating the software by the merchant, said activating permitting participation in the aggregator by controlling a portal switch to permit users of the aggregator to connect to a merchant site to access merchant data including data available to the users only by accessing the merchant site from the aggregator through the portal switch;
    (d) controlling the portal switch; and
    (e) connecting to a merchant site.

2. A method as in claim 1, further comprising allowing the aggregator to specify data transfer parameters to influence an exchange of information between a computer associated with the merchant and the aggregator.

3. A method as in claim 2, further comprising providing the merchant with an encryption key to permit the aggregator to verify authenticity of said merchant.

4. A method as in claim 1, wherein allowing the merchant to activate the software includes allowing the merchant to set the portal switch to specify data transfer parameters, services and data that may be exchanged between the merchant and the aggregator.

5. A method as in claim 4, further comprising providing the merchant with an encryption key to permit the aggregator to verify authenticity of said merchant.

6. A method as in claim 4, wherein allowing the merchant to set the portal switch to specify data transfer parameters, services and data includes allowing the merchant to set the portal switch to specify at least one of an upload option, a transfer format, a pricing option, a placement, a shopping option, a data distribution, and a data lifetime.

7. A method as in claim 6, wherein the transfer format is at least one of a profile format, an ASCII text, a spreadsheet, an interoperable catalogue format, a database exchange format, and an electronic data interchange.

8. A method as in claim 6, wherein the upload option includes a transfer protocol for the data that may be exchanged by the merchant and the aggregator.

9. A method as in claim 8, wherein the transfer protocol is at least one of a hypertext transfer protocol, a file transfer protocol, an xmodem protocol, a standard query language, a simple mail transfer protocol, and an open database connectivity.

10. A method as in claim 6, wherein the pricing option allows the aggregator to display a price of goods or services of the merchant to a user of the aggregator.

11. A method as in claim 6, wherein the data lifetime specifies a period of time during which data from the merchant may be displayed to a user of the aggregator.

12. A method as in claim 6, wherein the placement influences where data from the merchant may be displayed to a user of the aggregator.

13. A portal switch, residing on a computer-readable medium, for selectively linking a computer associated with a merchant to an aggregator, the portal switch causing said computer to:
    (a) enable the merchant to participate in said aggregator based on a setting of said portal switch selected by said merchant;
    (b) exchange information between said computer and said aggregator based on the setting of said portal switch, wherein to participate in the aggregator, information regarding the merchant need not have been made available to the aggregator; and
    (c) connect users of the aggregator to a merchant site to access merchant data through said portal switch, the portal switch enabling access to merchant data including data available to the users only through the portal switch.

14. A portal switch as in claim 13, further comprising an encryption key to permit the aggregator to verify authenticity of the merchant.

15. A portal switch as in claim 13, wherein the aggregator specifies data transfer parameters to influence an exchange of information between the computer and the aggregator.

16. A portal switch as in claim 15, further comprising an encryption key to permit the aggregator to verify authenticity of the merchant.

17. A portal switch as in claim 13, wherein said setting specifies data transfer parameters, services and data that may be exchanged between the computer and the aggregator.

18. A portal switch as in claim 17, wherein data transfer parameters, services, and data include an upload option, a transfer format, a pricing option, a placement, a shopping option, a data distribution, and a data lifetime.

19. A portal switch as in claim 18, wherein the transfer format is at least one of a profile format, an ASCII text, a spreadsheet, an interoperable catalogue format, a database exchange format, and an electronic data interchange.

20. A portal switch as in claim 18, wherein the upload option includes a transfer protocol for the information exchanged between said computer and the aggregator.

21. A portal switch as in claim 20, wherein the transfer protocol is at least one of a hypertext transfer protocol, a file transfer protocol, an xmodem protocol, a standard query language, a simple mail transfer protocol, and an open database connectivity.

22. A portal switch as in claim 18, wherein the pricing option allows the aggregator to display a price of goods or services of the merchant to a user of the aggregator.

23. A portal switch as in claim 18, wherein the data lifetime specifies a period of time during which data from the merchant may be displayed to a user of the aggregator.

24. A portal switch as in claim 18, wherein the placement influences where data from the computer associated with the merchant may be displayed to a user of the aggregator.

25. A portal switch, residing on a computer-readable medium, for selectively linking a computer associated with a merchant to an aggregator, the portal switch causing said computer to:

(a) enable the merchant to participate in said aggregator based on a setting of said portal switch selected by said merchant;

(b) exchange information between said computer and said aggregator based on the setting of said portal switch;

(c) enable the merchant to give permission to the aggregator to display data associated with the merchant to a user of the aggregator, wherein to participate in the aggregator, information regarding the merchant need not be made available to the aggregator; and (d) connect users of the aggregator to a merchant site to access merchant data through said portal switch, the portal switch enabling access to merchant data including data available to the users only through the portal switch.

* * * * *